(12) United States Patent
Matsumoto (10) Patent No.: US 9,082,292 B2
(45) Date of Patent: Jul. 14, 2015

(54) DISPLAY APPARATUS, HARDWARE REMOTE CONTROLLER, AND REMOTE CONTROL SYSTEM

(71) Applicant: pita4 mobile LLC, Palo Alto, CA (US)

(72) Inventor: Kazuhiko Matsumoto, Palo Alto, CA (US)

(73) Assignee: PITA4 Mobile LLC, Palo Alto, CA (US)

( * ) Notice: Subject to any disclaimer, the term of this patent is extended or adjusted under 35 U.S.C. 154(b) by 302 days.

(21) Appl. No.: 13/875,717

(22) Filed: May 2, 2013

(65) Prior Publication Data

US 2014/0327528 A1 Nov. 6, 2014

(51) Int. Cl.
*G08C 19/00* (2006.01)
*H04N 21/41* (2011.01)
*H04N 21/422* (2011.01)
*H04N 5/44* (2011.01)
*H04N 21/431* (2011.01)

(52) U.S. Cl.
CPC .............. *G08C 19/00* (2013.01); *H04N 5/4403* (2013.01); *H04N 21/4126* (2013.01); *H04N 21/42204* (2013.01); *H04N 21/4312* (2013.01); *H04N 21/4316* (2013.01)

(58) Field of Classification Search
CPC .......... H04N 21/4312; H04N 21/4126; H04N 21/42204; H04N 21/4316; H04N 5/4403; G08C 23/04; G06F 3/0484; G06F 3/048
USPC ............. 340/12.25, 7.55, 7.56; 345/169, 173; 348/734; 398/106, 107, 108
See application file for complete search history.

(56) References Cited

U.S. PATENT DOCUMENTS 6,791,467 B1 * 9/2004 Ben-Ze'ev ................. 340/12.25
7,590,430 B1 * 9/2009 Urbanek ....................... 455/566
2009/0161027 A1 * 6/2009 Hardacker et al. ........... 348/734

* cited by examiner

*Primary Examiner* — Jennifer Mehmood
*Assistant Examiner* — Yong Hang Jiang
(74) *Attorney, Agent, or Firm* — Gard & Kaslow LLP (57) ABSTRACT

Disclosed is a display apparatus which is used so as to produce a hardware remote controller capable of operating a plurality of instruments. The display apparatus includes a first display part which displays remote control information including external shape information of a remote control of a target instrument to be operated, and a second display part which displays a custom remote control object to be generated on the basis of the external shape information. The remote control information is acquired from a remote control database which includes external shape information of remote controls of the plurality of instruments on the basis of instrument information of the target instrument and/or the remote control of the target instrument.

13 Claims, 11 Drawing Sheets

DISPLAY APPARATUS, HARDWARE REMOTE CONTROLLER, AND REMOTE CONTROL SYSTEM

BACKGROUND OF THE INVENTION

1. Field of the Invention

The present invention relates to a display apparatus, a hardware remote controller, and a remote control system, and in particular, a display apparatus which is used so as to produce a hardware remote controller capable of operating a plurality of instruments, a hardware remote controller which is produced using the display apparatus, and a remote control system including the hardware remote controller.

2. Background Art

Usually, in remotely operating home appliances, such as an air-conditioner, an accompanying dedicated remote control is used. Examples of the home appliances include a television, a recording instrument, an illumination instrument, a personal computer, and the like, in addition to the air-conditioner.

In recent years, as there are an increasing number of instruments including the home appliances at home, the number of dedicated remote controls increases, and there is a problem in that management or operation is not easily performed.

In order to solve this problem, a hardware remote control which can operate a plurality of instruments single handedly has been developed. This type of remote control is called a learning remote control. The learning remote control is made to learn the functions of a plurality of dedicated remote controls, whereby the functions of the respective dedicated remote controls can be unified in the single learning remote control.

However, the learning remote control registers and uses the functions of the dedicated remote controls to buttons arranged in a chassis in advance, and it is not possible to select the number of buttons, the arrangement position, and the like. Accordingly, in order to increase user-friendliness, many improvements are necessary.

With the recent widespread use of portable devices having a touch panel, such as smart phones, a technique relating to a software remote control using a portable device as a remote control has been also developed.

Pamphlet of International Publication No, WO2009/123030 discloses an example of the above-described technique, and a UI constituted by UI objects of various keys, buttons, and the like, which receives a user operation input is displayed on a display unit of a device. According to this technique, a plurality of UI objects can be displayed inside one UI display region on the basis of user's selection, and a plurality of UI objects can be selected from one UI or a plurality of UIs.

According to this technique, a plurality of UI objects are automatically arranged inside a display region by an automatic layout processing unit.

However, while an use frequency and an easy-to-press position, or the like of a button of a remote control differs depending on users, in the above-described technique, for example, there is a problem in that a user is unable to freely designate the arrangement or the like, and the request of each user may not be met. In addition, there is a problem in that it is not possible to realize functions beyond the functions of a portable device as a chassis.

SUMMARY OF THE INVENTION

An object of the invention is to provide a display apparatus which is capable of creating a hardware remote controller customized for each user, a hardware remote controller which is produced using the display apparatus, and a remote control system including the hardware remote controller.

According to an aspect of the invention, there is provided a display apparatus which is used so as to produce a hardware remote controller capable of operating plurality of instruments. The display apparatus includes a first display part which displays remote control information including external shape information of a remote control of a target instrument to be operated, and a second display part which displays a custom remote control object to be generated on the basis of the external shape information. The remote control information is acquired from a remote control database which includes external shape information of remote controls of the plurality of instruments on the basis of instrument information of the target instrument and/or the remote control of the target instrument.

The instrument information may be specified by analyzing an image obtained by capturing the target instrument and/or the remote control of the target instrument.

The instrument information may be specified by analyzing a signal transmitted from the remote control of the target instrument.

It is preferable that the external shape information includes operating means information for operating the target instrument, and the custom remote control object has a direct operating means object and/or an indirect operating means object associated with the operating means information.

The direct operating means object may be arranged at an arbitrary position of the custom remote control object.

It is preferable that the indirect operating means object can be configured with details of input means individually.

It is preferable that the external shape information includes display part information or displaying information of the target instrument, and the custom remote control object has a display part object associated with the display part information, and the display part object is arranged at an arbitrary position of the custom remote control object.

It is preferable that the custom remote control object is generated on the basis of place shape information of a place where the hardware remote controller is installed.

The place shape information may be acquired from a shape database.

The place shape information may be acquired by 3D scanning the place.

It is preferable that the shape database is present on a network.

The custom remote control object may have an activation button object for activating the function of an instrument different from the target instrument, and the activation button object may be arranged at an arbitrary position of the custom remote control object.

It is preferable that the remote control database is present on a network.

It is preferable that the custom remote control object is able to be stored on a network.

According to another aspect of the invention, there is a hardware remote controller which is produced using a display apparatus. The display apparatus is used so as to produce a hardware remote controller capable of operating a plurality of instruments. The display apparatus includes a first display part which displays remote control information including external shape information of a remote control of a target instrument to be operated, and a second display part which displays a custom remote control object to be generated on the basis of the external shape information. The remote control information is acquired from a remote control database which includes external shape information of remote controls of the plurality of instruments on the basis of instrument information of the target instrument and/or the remote control of the target instrument. The hardware remote controller includes an external shape part which is produced on the basis of a custom remote control object, an input unit which receives a predetermined input, communication unit which performs communication with the instrument to be operated, and a control unit which controls the input unit and the communication unit.

It is preferable that the external shape information includes operating means information for operating the target instrument, and the custom remote control object has a direct operating means object and/or an indirect operating means object associated with the operating means information.

It is preferable that the direct operating means object is arranged at an arbitrary position of the custom remote control object, the input unit is a part of the external shape part corresponding to the direct operating means object, and the input, is a direct operation on the part.

It is preferable that the input unit is a part which corresponds to the indirect operating means object, and the input is an indirect operation on the part.

The external shape part may be produced using a 3D printer.

It is preferable the input, unit, the communication unit, and the control unit are constituted by combining a plurality of common module components, and the combination is changeable in accordance with the shape of the custom remote control object and/or the arrangement of the direct operating means object.

The external shape part may be produced with an integrated wiring, and the input unit, the communication unit, and the control unit may be connected together through the integrated wiring.

The hardware remote controller may further include a sensor unit which detects predetermined information, in which information obtained by the sensor unit may be transmitted to the target instrument or other instruments.

According to still another aspect of the invention, there is provided a remote control system including one or more target instruments, and a hardware remote controller which is produced using a display apparatus. The display apparatus is used so as to produce a hardware remote controller capable of operating a plurality of instruments. The display apparatus includes a first display part which displays remote control information including external shape information of a remote control of a target instrument to be operated, and a second display part which displays a custom remote control object to be generated on the basis of the external shape information. The remote control, information is acquired from a remote control database which includes external shape information of remote controls of the plurality of instruments on the basis of instrument information of the target instrument and/or the remote control of the target instrument. The hardware remote controller includes an external shape part which is produced on the basis of a custom remote control object, an input unit which receives a predetermined input, a communication unit which performs communication with the instrument to be operated, and a control unit which controls the input unit and the communication unit.

The remote control system may further include a converter which converts a signal, in which the hardware remote controller may perform communication with the target instrument through the converter.

The converter and the hardware remote controller may be connected together through a network.

According to the display apparatus of the invention, it is possible to easily produce a hardware remote controller customized for each user.

The hardware remote controller of the invention can improve operation performance of the hardware remote controller for an individual user.

In addition, according to the remote control system of the invention, the hardware remote controller is provided, whereby a target instrument can be operated more easily.

DETAILED DESCRIPTION OF THE INVENTION

Figure 1:
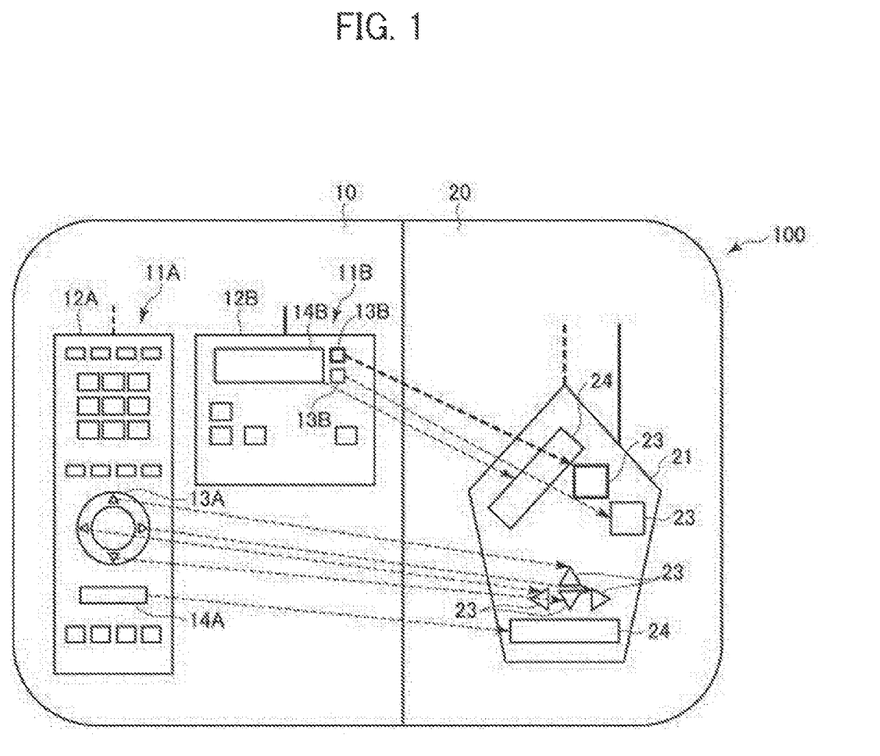
FIG. 1 is a schematic view showing an example of a display apparatus of the invention.
Figure 2:
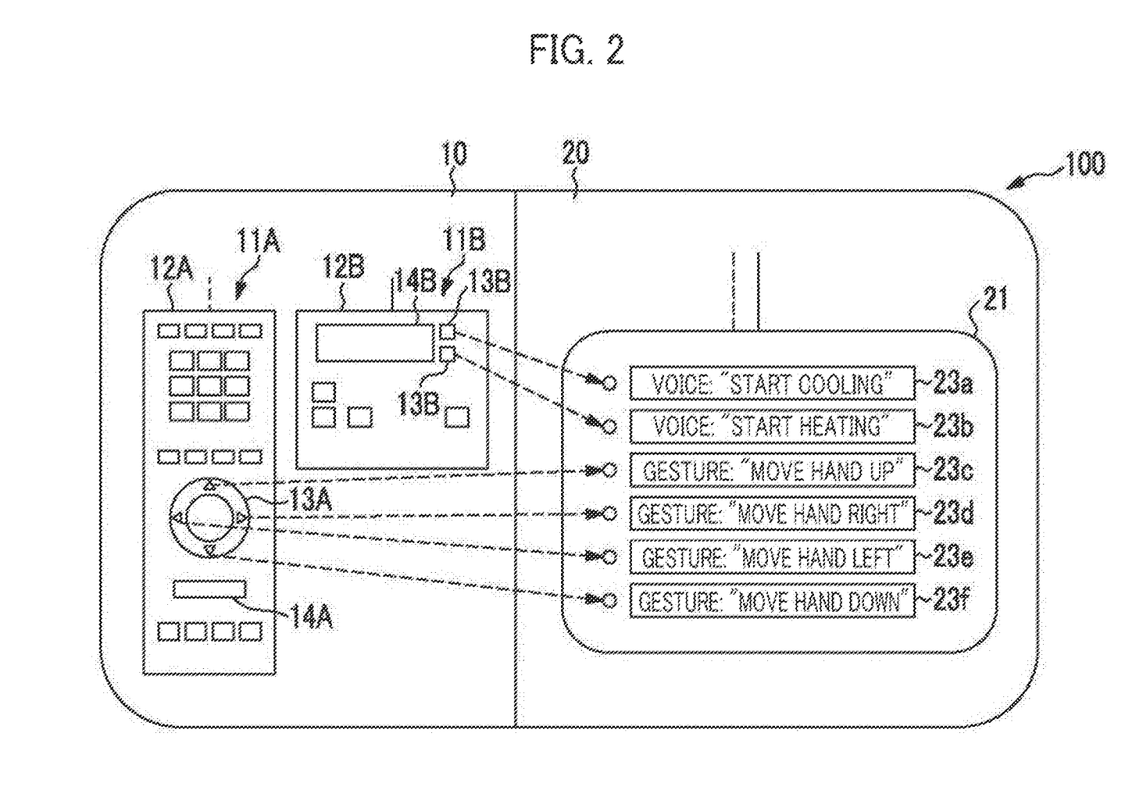
FIG. 2 is a schematic view showing an example of a display apparatus of the invention.

An embodiment of a display apparatus of the invention will be described referring to the drawings. FIG. 1 is a diagram schematically showing an example of a display apparatus of the invention. FIG. 2 is a diagram schematically showing an operation example of the display apparatus.

The display apparatus of the invention is a display apparatus which is used so as so produce a hardware remote controller capable of operating a plurality of instruments. Examples of the instruments include home appliances, such as an air-conditioner, a television, a recording instrument, an illumination instrument, and a personal computer, an engine, door-lock, or opening/closing of windows of an automobile, lock, of doors or windows of buildings, and the like, and include all instruments which can be remotely operated.

As shown in FIG. 1, a display apparatus 100 includes a first display part 10 and a second display part 20.

The first display part 10 displays remote control information 11 (in FIG. 1, remote control information 11A of a television and remote control information 11B of an air-conditioner) including external shape information of a remote control of a target instrument to be operated. The external shape information includes operating means information 13 (in FIG. 1, operating means information 13A and 13B) for operating the target instrument or display part information 14 (in FIG. 1, display part information 14A and 14B) for displaying information of the target instrument described below, in addition to the shape 12 (in FIG. 1, designs 12A and 12B) of a chassis.

The second display part 20 displays a custom remote control object 21 which is generated on the basis of the external shape information.

The remote control information 11 is acquired from a remote control database which includes external shape information of remote controls of a plurality of instruments on she basis of the instrument information of the target instrument and/or the remote control of the target instrument.

It is preferable that the remote control database is present on a network. Because the remote control database should be updated every day so that the user can acquire latest remote control information 11. The remote control information which is registered in the remote control database may be data which is virtually prepared insofar as data can be materialized by hardware.

The instrument information of the target instrument and/or the remote control of the target instrument refers to information for identifying an instrument, such as the product number of the instrument.

The instrument information may be specified by analyzing an image obtained by capturing the target instrument and/or the remote control of the target instrument. Specifically, the instrument information is specified by comparing a captured image and the database.

The instrument information may be specified by analyzing a signal transmitted from the remote control of the target instrument. Specifically, a signal which is transmitted from the remote control of the target instrument is received, and the received remote control signal is compared with the database, thereby specifying the model of the target instrument and/or the remote control of the target instrument. When it is not possible to specify a model, a candidate is specified.

As described above, it is preferable that the external shape information includes operating means information (in FIG. 1, operating means information 13A and 13B) for operating the target instrument, and the custom remote control object 21 has a direct operating means object and/or an indirect operating means object associated with the operating means information.

The operating means information includes information relating to all means, such as buttons, a lever, and a dial, which are provided in the remote control of the target instrument and are used to operate the target instrument.

The direct operating means object is an object which represents means so be directly operated by the finger or the like of the user. The direct operating means object has an explicit position or shape, and the position or shape is displayed on the display apparatus 100.

The indirect operating means object is an object which represents means so be indirectly operated by any input, such as natural user interface (NUI) operation, an external input signal, brain-machine interface (BMI) operation, or a sensor input signal. The indirect operating means object may have no explicit position or shape, and the position or shape is not always displayed on the display apparatus 100.

The NUI operation refers to, for example, operation using gesture, voice, line of sight, or the like. The external input signal refers to, for example, an input signal from a computer program or an external system. The EMI operation refers to operation using a signal due to a small current flowing in a neural network. The sensor input signal refers to, for example, an input signal using detection data by an acceleration sensor or the like.

In the example shown in FIG. 1, the operating means information 13A represents a button which is used so as to move a cursor displayed on a television, and the operating' means information 13B represents a button which is used so as to activate a heating function of an air-conditioner.

At this time, the custom remote control object 21 has a direct operating means object 23 associated with the operating means information 13A and 13B, and the direct operating means object 23 can be arranged at an arbitrary position of the custom remote control object 21.

The indirect operating means object can be configured with details of input means individually.

In the example shown in FIG. 2, the custom remote control object 21 has indirect operating means objects 23 (in FIG. 2, voice recognition objects 23a and 23b and gesture recognition objects 23c to 23f) associated with the operating means information 13A and 13B.

While the objects 23a to 23f are displayed on the display apparatus in the form of a list, the objects do not have clear positions or shapes in the produced hardware remote controller.

It is preferable that the external shape information includes display part information 14A and 14B for displaying information of the target instrument. The display part information 14A and 14B includes information relating to a display part which is provided in the remote control of the target instrument and used to display information of the target instrument. In the example shown in FIGS. 1 and 2, the display part information 14A represents a display part in which the selected channel of the television is displayed, and the display part information 14B represents a display part in which a set temperature of the air-conditioner is displayed.

At this time, as shown in FIG. 1, the custom remote control object 21 may have a display part object 24 associated with the display part information 14A and 14B, and the display part object 24 can be arranged at an arbitrary position of the custom remote control object 21.

Figure 3:
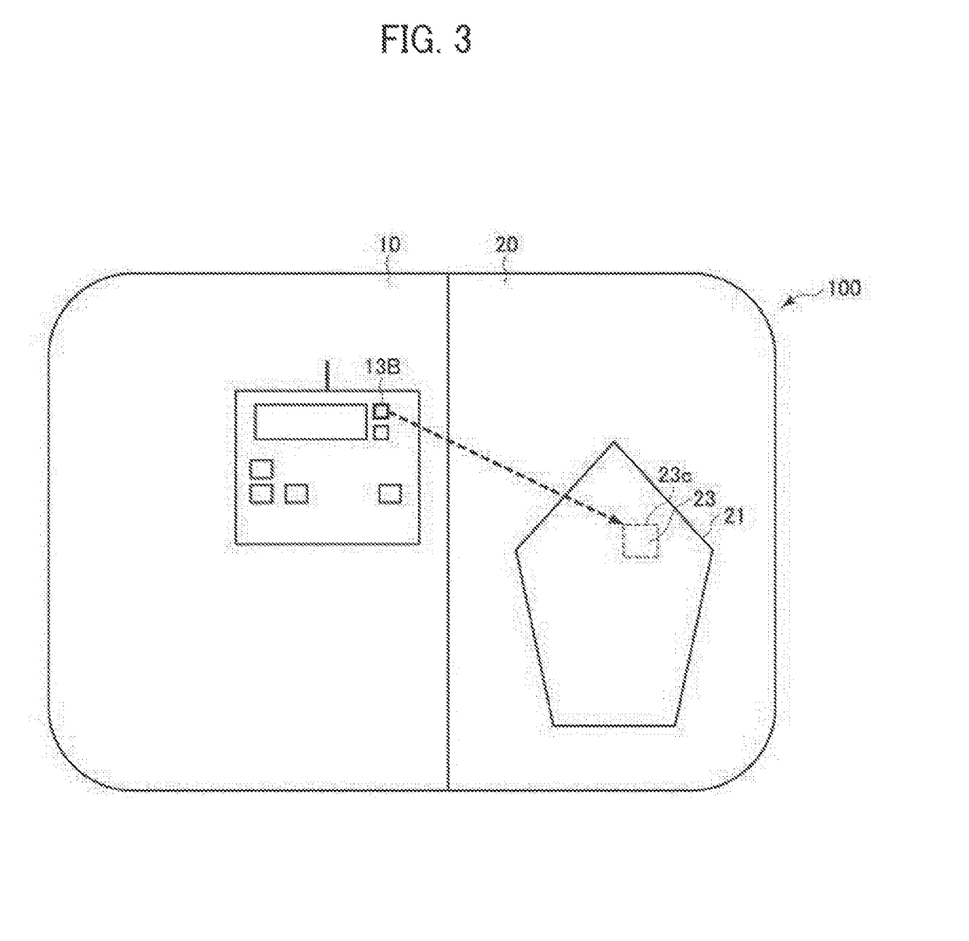
FIG. 3 is a schematic view showing an operation example of a display apparatus of the invention.

As shown in FIG. 3, after the operating means information and/or the display part information (in FIG. 3, the operating means information 13B) displayed on the first display part 10 is selected, an arbitrary position (in FIG. 3, a position 23C) of the custom remote control object 21 displayed on the second display part 20 may be selected, and the operating means object 23 and the display part object 24 may be created at the position of the custom remote control object 21, or vice versa. The operating means information and/or the display part information (in FIG. 3, the operating means information 13B) displayed on the first display part 10 may be dragged to an arbitrary position (in FIG. 3, the position 23C) of the custom remote control object 21 displayed on the second display part 20, and the operating means object 23 and the display part object 24 may be created at the position of the custom remote control object 21.

In regard to the operating means object 23 and/or the display part object 24 arranged on the second display part, the position, size, type, or design may be changed. The change of the type refers to, for example, change from a toggle switch to a button, and the change of the design refers to, for example change of a font or a display color. The operating means object 23 and/or the display part object 24 arranged once may be deleted. In regard to the indirect operating means object, the details of input means may be changed. For example, voice operation with words, "increase temperature" may be changed to gesture operation to move the right hand up.

Though not shown, the custom remote control object may be generated on the basis of place shape information of a place where the hardware remote controller is installed. The place shape information is not necessarily displayed graphically, and may be, for example, display of a character string, such as "company A table compatible shape". Examples of the place include various objects having a shape, to which the hardware remote control can be fixed, such as a wall of a house, recess, knob, and pipe of furniture, a steering wheel, a frame, or a change box of an automobile, a bicycle, or an motorcycle, a pocket of a cloth or a bag, a grip of an umbrella or a stick, a receiver, a keyboard, a monitor, a mouse, and the like. The place may refer to stationery or dishes which are small, lightweight, and mobile, as well as the objects which are large and immobile.

The place shape information may be acquired from a shape database, and may be acquired by 3D scanning a place where the hardware remote controller is installed. It is preferable that the shape database is present on a network.

Though not shown in FIG. 1, the custom remote control object 21 may have an activation button object for activating she functions of an instrument different from the target instrument. For example, as described below, when a hardware remote controller produced using the above-described display apparatus is combined in a smart phone and used, it is preferable that there is an activation button object for activating the functions (application, receiver function, or the like) of the smart phone. Similarly, it is preferable that there is an object displaying information (a caller, a subject of an incoming mail, or the like) of the smart phone. These objects may be arranged at an arbitrary position of the custom remote control object 21. The activation button object activates the functions of other instruments, and when an instrument is a smart phone, may also operate a target application or may operate the setting screen of the smart phone. As an example of operating the setting screen, there is an example where an object of a toggle switch switching the on/off of electric waves to be displayed on the setting screen of the smart phone is arranged in the custom remote control object 21, or the like.

It is preferable that the custom remote control object 21 generated on the basis of the external shape information is able to be stored on network. Accordingly, it becomes possible to share information with other users.

Figure 4:
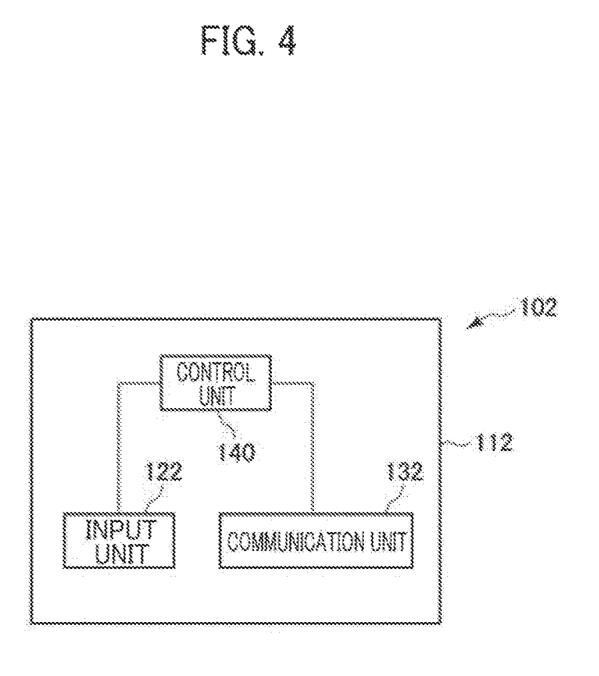
FIG. 4 is a block diagram of a hardware remote controller according to a first embodiment of the invention.
Figure 5:
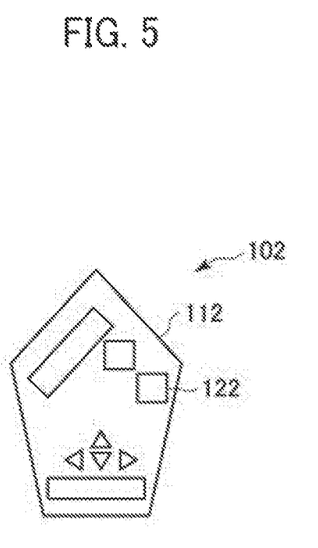
FIG. 5 is a schematic view of the hardware remote controller according to the first embodiment of the invention.

Next, a hardware remote controller according to the first embodiment of the invention will be described referring to the drawings. FIG. 4 is a block diagram showing a hardware remote controller according to the first embodiment. FIG. 5 is a diagram schematically showing the hardware remote controller according to the first embodiment.

As shown in FIGS. 4 and 5 as an example, the hardware remote controller according to the first embodiment of the invention is a hardware remote controller 102 which is produced using the above-described display apparatus, and including an external shape part 112 which is produced on the basis of the custom remote control object 21, an input unit 122 which receives a predetermined input, a communication unit 132 which performs communication with the target instrument to be operated, and a control unit 142 which controls the input unit 122 and the communication unit 132.

The external shape information may include operating means information for operating the target instrument, and the custom remote control object may have a direct operating means object and/or an indirect operating means object associated with the operating means information.

At this time, the direct operating means object may be arranged at an arbitrary position of the custom remote control object.

The input unit 122 may be a part of the external shape part 172 corresponding to the direct operating means object.

It is preferable that the input is a direct operation on the part. Specifically, when the input unit 122 is a button, the input is an action of the user to press the button with his/her finger.

Alternatively, the input unit may be a part, such as a recognition device, corresponding to an indirect operating means object, and the input may be an indirect operation on the part.

As the part corresponding to the indirect operating means object, in regard to the above-described NUI operation, there are a gesture recognition part, a voice recognition part, a line-of-sight tracking part, and the like. In regard to the BMI operation, there are a brain wave detection part, a nerve potential detection part, and the like.

In regard to the external input signal, there is an external input unit which receives an input from a computer program or an external system. In regard to the sensor input signal, there are an acceleration detection part and the like.

The hardware remote controller 102 may further include a sensor unit which detects predetermined information, in which information obtained by the sensor unit may be transmitted to the target instrument or other instruments. Specifically, as the sensor unit, there are a temperature detection unit, a humidity detection unit, an acceleration detection unit, a direction detection unit, a light quantity detection unit, a heartbeat detection unit, a voltage detection unit, and the like.

The user may transmit data of the custom remote control object produced by the above-described display apparatus to, for example, a remote control production company or the like, and may request the production of the hardware remote controller 102.

The external shape part 112 may be produced using a 3D printer. That is, a user who has a 3D printer can produce the external shape part 112 at home or the like personally. The user may combine the produced external shape part 112 with other components obtained separately, such as the control unit 142, thereby completing the hardware remote controller 101. It is preferable that the external shape part 112 is produced with an integrated wiring using a 3D printer. The integrated wiring can be connected to other components and other components may be connected together through the integrated wiring. Specifically, in is preferable that two kinds of materials of a conductor and an insulator are used, and the chassis and the integrated wiring are produced simultaneously as a single body using a 3D printing technique.

Figure 6A:
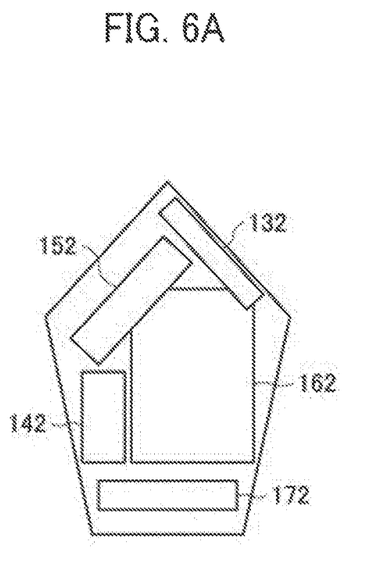
FIGS. 6A and 6B are schematic views of an internal structure and an external shape part of the hardware remote controller according the first embodiment of the invention.
Figure 6B:
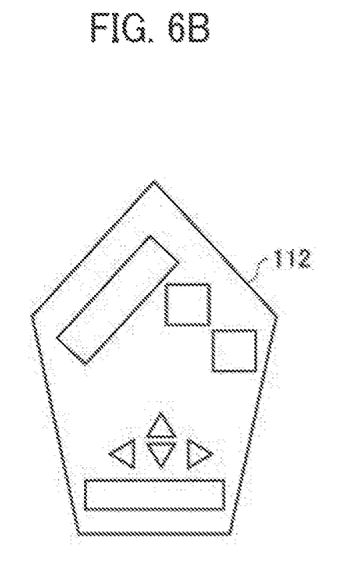

FIG. 6A is a diagram schematically showing the internal structure of the hardware remote controller 102, and FIG. 6B is a diagram schematically showing the external shape part 112 of the hardware remote controller 102. In this example, a display unit 152, a touch sensor unit 162, a control unit 142, a power supply unit 172, and a communication unit 132 shown in FIG. 6B are arranged inside the external shape part 112 produced by a 3D printer shown in FIG. 6B. The communication unit 132 performs communication with the target instrument in a wired or wireless manner, and for example, infrared communication, wired serial communication, or the like is performed.

Figure 7A:
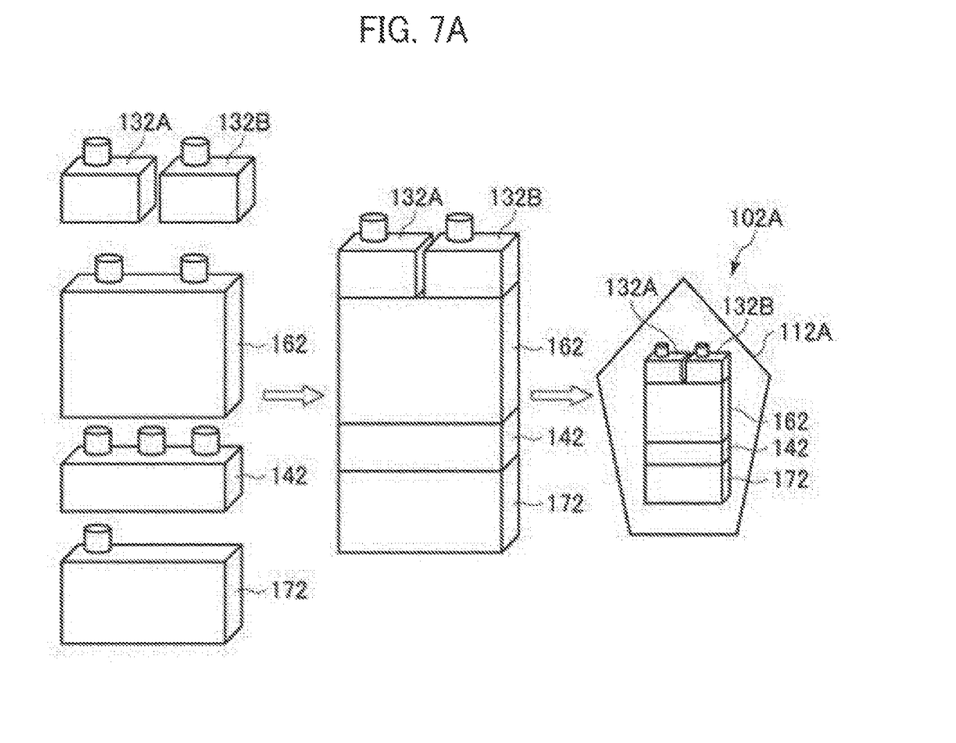
FIGS. 7A and 7B are schematic views showing an example of a method of producing a hardware remote controller of the invention.
Figure 7B:
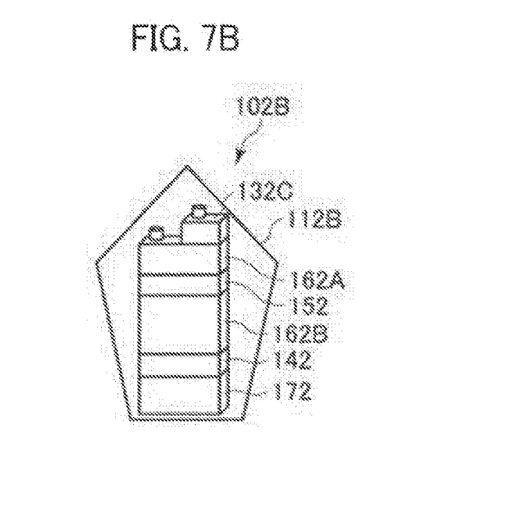

The input unit, the communication unit, and the control unit may be constituted by combining a plurality of common module components, and the combination may be changeable in accordance with the shape of the custom remote control object and/or the arrangement of the direct operating means object. It is preferable that other components are provided with connectors through which other components can be connected together, and the user can make connection with various combinations. FIGS. 7A and 7B are diagrams schematically showing an example where a hardware remote controller is produced by combining other components. FIG. 7A shows an example where a hardware remote controller 102A in which communication units 132A and 132B, a touch sensor unit 162, a control unit 142, and a power supply unit 172 are combined and arranged inside an external shape part 112A is produced. FIG. 7B shows an example where a hardware remote controller 102B in which a communication unit 132C, touch sensor units 162A and 162F, a display unit 152, a control unit 142, and a power supply unit 172 are combined and arranged inside an external shape part 112B is produced.

In this way, the user may appropriately combine other components which are arranged inside the external shape part 112, and may thus constitute various hardware remote controllers from a small number of kinds of common module components.

The connectors may have a function of electrically and/or optically connecting other components together, in addition to a function of mechanically connecting other components together. The user may instruct an order of other components necessary for producing a hardware remote controller on the display apparatus, and the display apparatus may automatically create a list of necessary other components from data of the custom remote control object and may transmit and give the order to a component sales company or the like.

Figure 8:
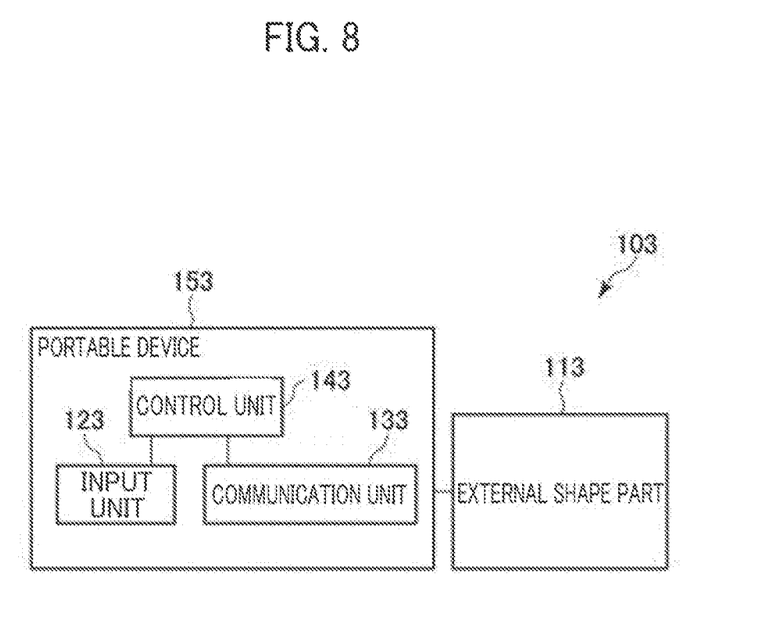
FIG. 8 is a block diagram of a hardware remote controller according to a second embodiment of the invention.

Next, a hardware remote controller according to a second embodiment of the invention will be described referring to the drawings. FIG. 8 is a block diagram showing a hardware remote controller according to the second embodiment, and FIG. 9 is a diagram schematically showing the hardware remote controller according to the second embodiment.

As shown in FIG. 8, a hardware remote controller 103 according to second embodiment of the invention is a hardware remote controller which is produced using the above-described display apparatus. The hardware remote controller 103 is a hybrid hardware remote controller of a portable device which executes software and a hardware remote controller, and is constituted by combining an external shape part 113 which is produced on the basis of a custom remote control object and a portable device 153 having an input unit 123 which receives a predetermined input, a communication unit 133 which performs communication with an target instrument to be operated, and a control unit 143 which controls the input unit 123 and the communication unit 133.

Figure 9:
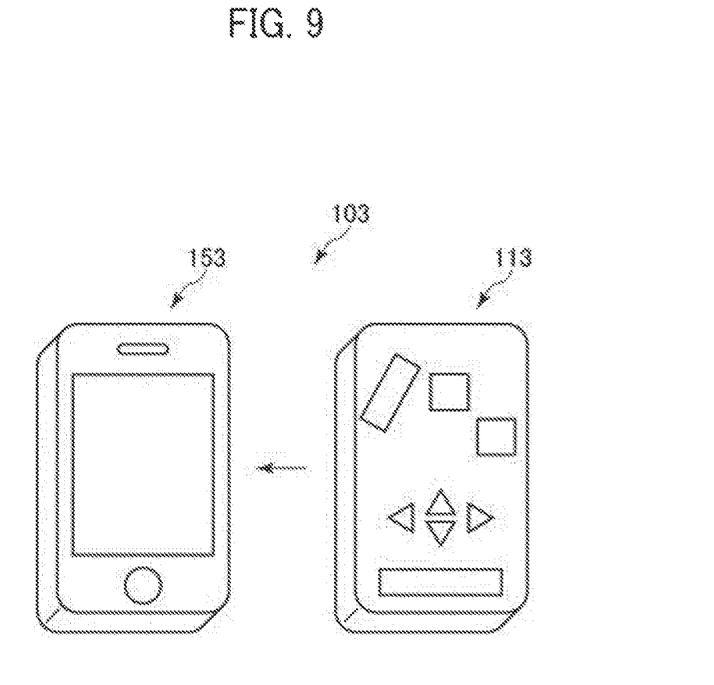
FIG. 9 is a schematic view of the hardware remote controller according to the second embodiment of the invention.

In the example shown in FIG. 9, the external shape part 113 is superposed on a portable device 153, such as a smart phone having a touch panel, and the portable device 153 is operated through the external, shape part 113. In the portable device 153, an target instrument to be operated is operated using a dedicated application or realizing a remote control function.

Figure 10:
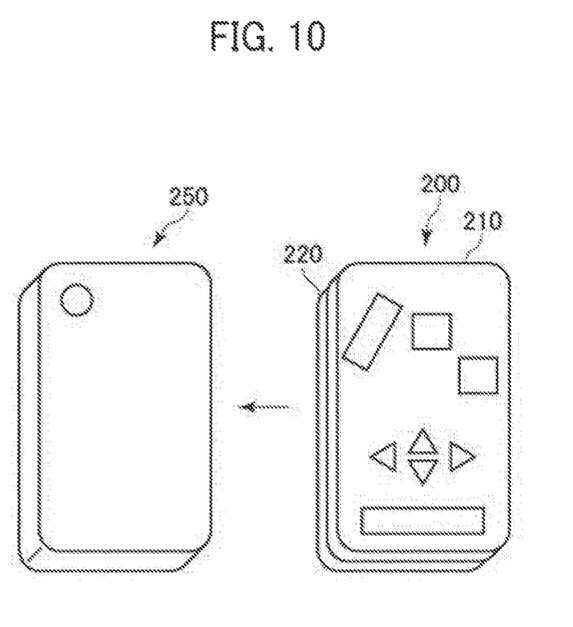
FIG. 10 is a schematic view showing an example of an electronic device cover of the invention.

Next, an embodiment of an electronic device cover of the invention will be described referring to the drawings. FIG. 10 schematically shows an example of an electronic device cover of the invention.

As shown in FIG. 10, an electronic device cover 200 of the invention is attached to an electronic device 250 and used. The electronic device cover 200 is embedded with a hardware remote controller 210 which is a hardware remote controller produced using the above-described display apparatus. The hardware remote controller 210 includes an external shape part which is produced on the basis of a custom remote control object, an input unit which receives a predetermined input, a communication unit which performs communication with the target instrument to be operated, and a control unit which controls the input unit and the communication unit. The details of the hardware remote controller 210 are as described above.

In the example shown in FIG. 10, the electronic device cover 200 includes the hardware remote controller 210 and an electronic device attachment part 220. With this configuration, the use can carry the hardware remote controller 210 more simply.

Figure 11:
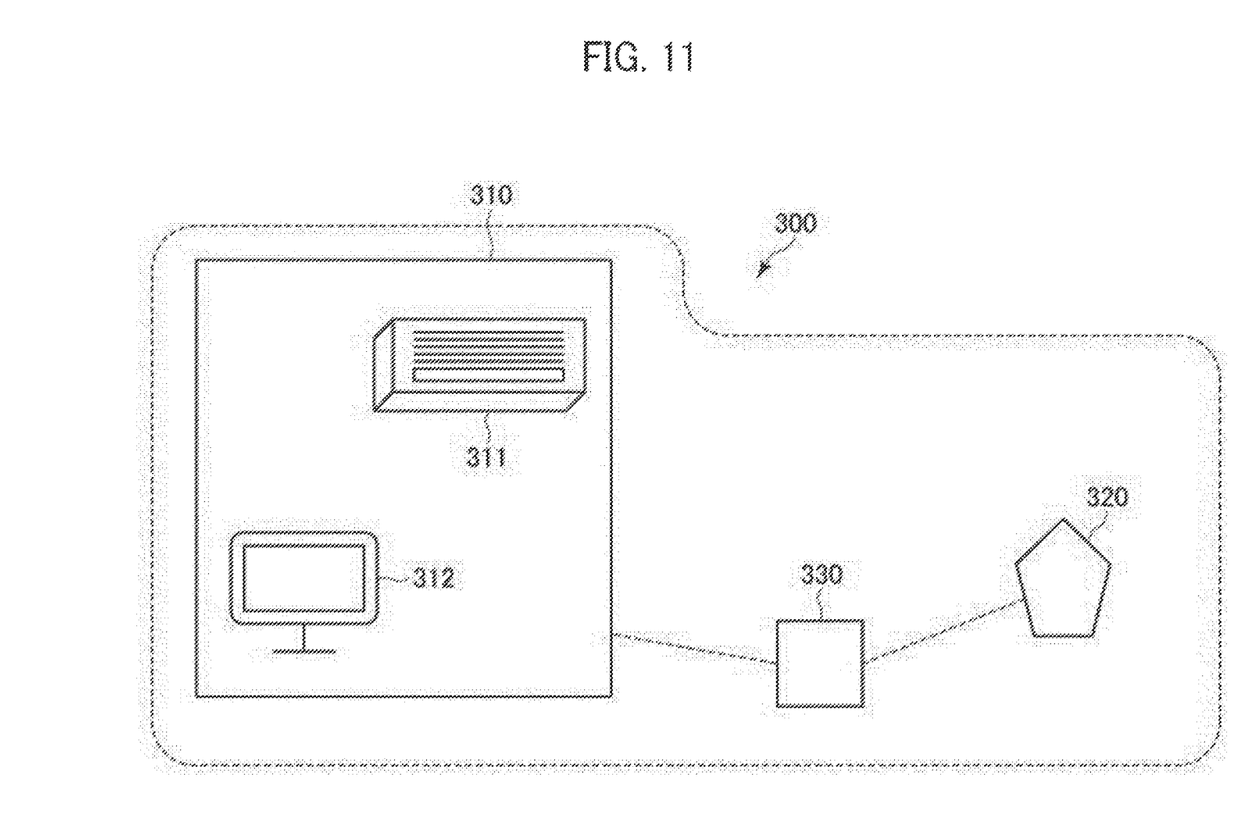
FIG. 11 is a schematic view showing an example of a remote control system of the invention.

Next, an embodiment of a remote control system of the invention will be described referring to the drawings. FIG. 11 schematically shows an example of a remote control system of the invention.

As shown in FIG. 11, a remote control system 300 of the invention includes one or more target instruments 310 (in FIG. 11, air-conditioner 311 and television 312), and a hardware remote controller 320 which is a hardware remote controller produced using the above-described display apparatus. The hardware remote controller 320 includes an external shape part which is produced on the basis of a custom remote control object, an input unit which receives a predetermined input, a communication unit which performs communication with the target instrument to be operated, and a control unit which controls the input unit and the communication unit. The details of the hardware remote controller 320 are as described above.

It is preferable that the remote control system 300 further includes a converter 330 which converts a signal. The hardware remote controller 320 can perform communication with the target instrument 310 through the converter 330.

It is preferable that the converter 330 and the hardware remote controller 320 are connected together through a network. Accordingly, if there is a place where network connection is possible, the user can operate the hardware remote controller 320 from outside to operate the target instrument 310 installed at home.

As described above, for example, when a place where the hardware remote controller 320 will be installed is present near the target instrument 310, it is preferable so produce a hardware remote controller having a shape conforming to the place. It is preferable that contact or non-contact communication means which can perform communication with the hardware remote controller 320 is provided at the place.

The hardware remote controller 320 may have a moving function. In this case, for example, a configuration in which, when the user does not use the hardware remote controller 320, the hardware remote controller 320 moves to the place, and when the user wants to use the hardware remote controller 320, the hardware remote controller 320 moves straight toward the user. Therefore, it is possible to further improve user-convenience.

What is claimed is:

1. A display apparatus which is used so as to produce a hardware remote controller capable of operating a plurality of instruments, the display apparatus comprising:
    a first display part which displays remote control information including external shape information of a remote control of a target instrument to be operated;
    a second display part which displays a custom remote control object to be generated on the basis of the external shape information;
    wherein the external shape information includes operating means information for operating the target instrument;
    the custom remote control object has a direct operating means object and/or an indirect operating means object associated with the operating means information; and
    wherein the remote control information is acquired from a remote control database which includes external shape information of remote controls of the plurality of instruments on the basis of instrument information of the target instrument and/or the remote control of the target instrument.

2. The display apparatus according to claim 1, wherein the instrument information is specified by analyzing an image obtained by capturing the target instrument and/or the remote control of the target instrument.

3. The display apparatus according to claim 1, wherein the instrument information is specified by analyzing a signal transmitted from the remote control of the target instrument.

4. The display apparatus according to claim 1, wherein the direct operating means object is arranged at an arbitrary position of the custom remote control object.

5. The display apparatus according to claim 1, wherein the indirect operating means object can be configured with details of input means individually.

6. The display apparatus according to claim 1, wherein the external shape information includes display part information for displaying information of the target instrument, and the custom remote control object has a display part object associated with the display part information, and the display part object is arranged at an arbitrary position of the custom remote control object.

7. The display apparatus according to claim 1, wherein the custom remote control object is generated on the basis of place shape information of a place where the hardware remote controller is installed.

8. The display apparatus according to claim 7, wherein the place shape information is acquired from a shape database.

9. The display apparatus according to claim 7, wherein the place shape information is acquired by 3D scanning the place.

10. The display apparatus according to claim 8, wherein the shape database is present on a network.

11. The display apparatus according to claim 1, wherein the custom remote control object has an activation button object for activating the function of an instrument different from the target instrument, and the activation button object is arranged at an arbitrary position of the custom remote control object.

12. The display apparatus according to claim 1, wherein the remote control database is present on a network.

13. The display apparatus according to claim 1, wherein the custom remote control object is able to be stored on a network.

* * * * *